3,510,147
SULKY DEVICE FOR MAINTAINING A HORSE AT
  A CORRECT ATTITUDE WITH RESPECT TO SAID
  SULKY
Guido Malvicini and Riccardo Malvicini, both of Via
  Monterosa, 16, Milan, Italy
Filed June 6, 1968, Ser. No. 734,995
Claims priority, application Italy, July 6, 1967,
  18,067/67
Int. Cl. B62c 1/08
U.S. Cl. 280—63                                    8 Claims

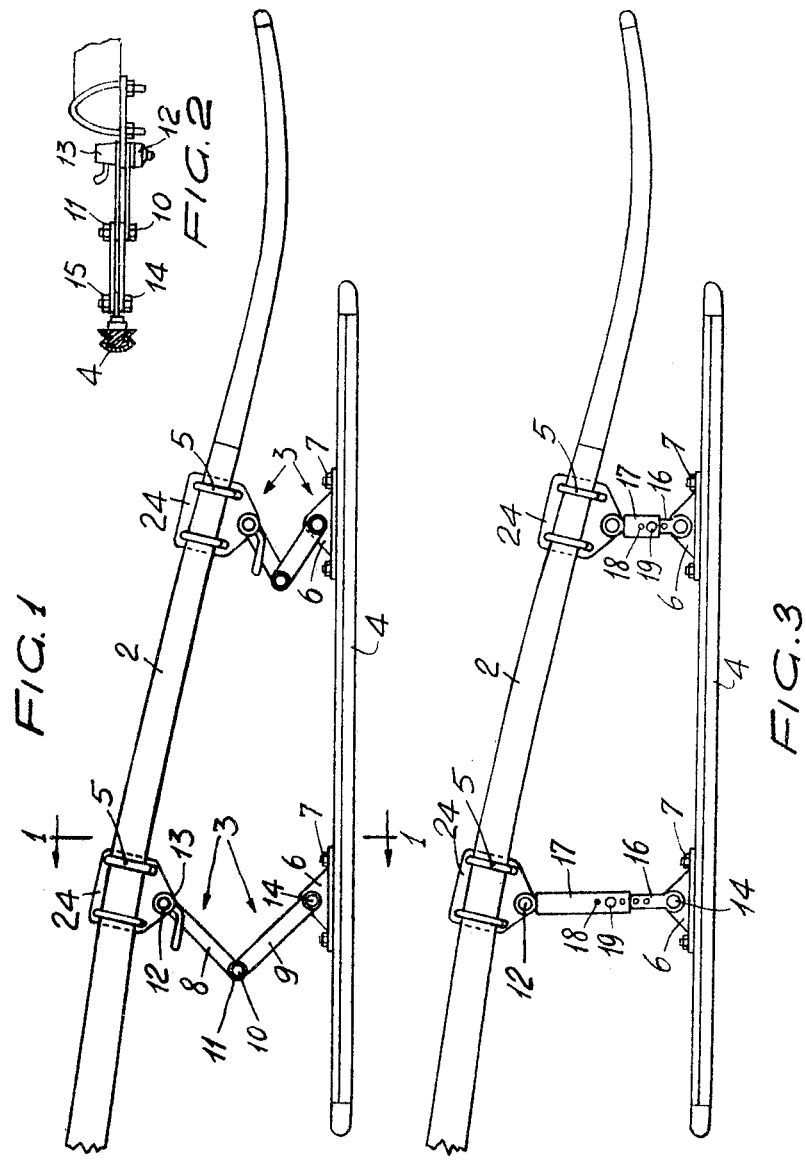

ABSTRACT OF THE DISCLOSURE

A sulky device for maintaining a horse at a correct attitude with respect to said sulky, comprising at one or each of the sulky shafts one or more adjustable supports, and a bar carried by the latter which is adapted to rest against a horse's side, each adjustable support comprising a plate provided with a U bolt rendering it fast with the sulky shaft, a bracket fast with the bar; a rod respectively pivoted at an end to said plate and at the other end to said bar; each pivoting being formed of a bolt and nut, allowing said rod to be locked at the desired position, each rod of the support being formed of two pairs of parallel bars angularly connected to one another by a bolt and nut allowing said angle to be varied and said pairs of bars to be locked at the preselected respective position.

---

This invention relates to a sulky device for maintaining a horse at a correct attitude with respect to said sulky.

As known, the term "sulky" relates to a very light, two-wheeled one-horse racing vehicle for single person, as used for trotting races.

When a racehorse trots or ambles between the shafts of a sulky, the event may occur that instead of maintaining a correct attitude as substantially according to the longitudinal axis of the sulky, it will tend to move to either shaft with its back.

As a result, the horse's effort cannot be completely exploited for attaining the maximum speed.

In addition, the horse's action would be uneven, particularly at curves, and in order to correct it the jockey shall exert a stress on the horse's mouth through the reins, this would involve a further disturbance for the horse which will tend to run irregularly.

Additionally, particularly at curves, that is just when this action of the jockey is more necessary, this would be of a difficult fulfillment.

Finally, the racehorse cannot fully develop therefore its actual athletic abilities.

Thus, it is the object of the present invention to provide a device for application to a sulky to maintain a horse at a correct attitude during trotting or ambling with respect to the sulky.

More particularly, it is the object of the present invention to provide a device of the above type which is characterized by comprising at one or each of the sulky shafts one or more adjustable supports and a bar carried thereby adapted to rest against a horse's side.

The accompanying drawing schematically shows by way of example and not of limitation two embodiments of the device according to the present invention, and namely:

FIG. 1 is a plan view showing a first embodiment of the present device as applied to a sulky shaft;

FIG. 2 is a sectional view of the device in FIG. 1 taken along the line 1—1 thereof; and FIG. 3 is a plan view similar to that of FIG. 1 showing a second embodiment of the present device.

Particularly referring to FIGS. 1 and 2, it is seen that the device of the present invention comprises at a shaft 2 of a sulky two adjustable supports indicated at 3 and a bar 4 carried thereby which is adapted to rest against a horse's side between the sulky shafts.

In the representation of FIGS. 1 and 2 the assembly formed of supports 3 and bar 4 is arranged at only one shaft of the sulky, but it is intended that the device also contemplates the possibility of arranging a similar assembly at the other shaft.

In the embodiment of FIGS. 1 and 2, each adjustable support 3 comprises a plate 24 provided with U bolts 5 rendering it fast with shaft 2.

Each support also comprises a bracket 6 fast with bar 4 through screws 7.

A crank rod is inserted between plate 24 and bracket 6, which crank rod is formed of two pairs of parallel bars 8 and 9 angularly interconnected by a bolt 10 provided with a nut 11 allowing the angle to be changed and clamping of bars 8 and 9 at the preselected relative position.

The crank rod (and more particularly the bars 8 and 9 forming it) is pivoted at its two ends respectively on plate 24 through bolt 12 provided with a thumb nut 13 and relative to bracket 6 by bolt 14 provided with nut 15.

By pivotings formed of bolts 10, 12 and 14 with relative nuts 11, 13 and 15, rod 4 may be arranged at desired position relative to shaft 2 and locked at this position by tightening said nuts on said bolts.

As seen in a plan view, the rod may also be disposed parallel to the sulky axis, or in such a manner as to form any angle therewith.

Bar 4 is preferably straight, but in the case may be wholly or partially curved.

In addition, bar 4 may be of a rigid or semi-rigid material, or may have a rigid core and a resilient outside.

The embodiment shown in FIG. 3 is wholly similar to that shown in detail in FIGS. 1 and 2, differing only in that the rod for each of the supports 3 is a telescopic tubular rod, each of the two components 16 and 17 of which carry a plurality of holes at the ends penetrating into one another, said holes 18 being adapted to be engaged by a pin 19 so as to cause said rod to have the desired length.

The operation of the device according to the present invention is as follows.

By operating as above described, either rod 4 of the device is placed at the desired position so as to rest substantially against a horse's side when the latter is between the sulky shafts. Thus, when running, the horse is caused to maintain a correct attitude and, therefore, the effort which can be produced by the horse is fully exploited.

Modifications and changes can be made to the device according to the present invention without departing for this from the protective field of the invention.

Particularly, the rods forming part of the supports may be constructed in any manner.

What is claimed is:

1. A sulky device comprising a pair of wheels, wheel supporting means, and a pair of shafts connected to said wheel supporting means, said pair of shafts having a pair of positioning bars adapted to rest against the sides of a horse positioned between said shafts, at least one transversely adjustable supporting means adjustably affixing one of said positioning bars to the shaft adjacent thereto and spacedly therefrom, said adjustable supporting means adapted to position said positioning bars in a plane parallel to the plane of said pair of shafts.

2. A sulky device according to claim 1 wherein each positioning bar is affixed to its adjacent shaft with two adjustable supports.

3. A device according to claim 2 wherein each adjustable support comprises a system of supporting members, one of said supporting members connected to a positioning bar and the other of said supporting members connected to the shaft, said supporting members being adjustably connected to each other such that said positioning bar may be firmly fixed in a desired position relative to its adjacent shaft.

4. A device according to claim 3 wherein said supporting systems comprise a pair of parallel support members pivotally connected to each other, to the positioning bar and to its adjacent shaft, said pivotal connections adapted to be locked in position.

5. A device according to claim 3 wherein said supporting system comprises telescopic tubular rods.

6. A device according to claim 5 wherein said positioning bar is straight.

7. A device according to claim 5 wherein at least one positioning bar is curved to adapt to the sides of a horse positioned between said shafts.

8. A device according to claim 5 wherein both of said positioning bars are partially curved.

References Cited

UNITED STATES PATENTS

| | | | |
|---|---|---|---|
| 498,790 | 6/1893 | Harrington | 280—63 |
| 525,033 | 8/1894 | Stoddard | 280—63 |
| 579,149 | 3/1897 | Haywood et al. | 280—63 |
| 643,728 | 2/1900 | Payne | 280—63 |

BENJAMIN HERSH, Primary Examiner

R. SONG, Assistant Examiner